United States Patent [19]
Shimada et al.

[11] Patent Number: 5,982,948
[45] Date of Patent: Nov. 9, 1999

[54] IMAGE READER

[75] Inventors: Masaya Shimada, Onojo; Yuji Toyomura, Fukuoka, both of Japan

[73] Assignee: Matsushita Electric Industrial Co., Ltd., Osaka, Japan

[21] Appl. No.: 08/886,946

[22] Filed: Jul. 2, 1997

[30] Foreign Application Priority Data

Jul. 4, 1996 [JP] Japan .................................. 8-174717

[51] Int. Cl.⁶ ...................................................... H04N 1/40
[52] U.S. Cl. .......................... 382/274; 358/461; 358/464
[58] Field of Search .................... 358/461, 448, 358/443, 404, 464, 498; 382/274; 356/375; H04N 1/40

[56] References Cited

U.S. PATENT DOCUMENTS

| | | | |
|---|---|---|---|
| 4,691,240 | 9/1987 | Kurusu et al. | 358/464 |
| 4,827,351 | 5/1989 | Sakamato | 358/447 |
| 5,101,284 | 3/1992 | Tanabe | 358/461 |
| 5,682,252 | 10/1997 | Ando | 358/461 |

*Primary Examiner*—Kim Yen Vu
*Attorney, Agent, or Firm*—Venable; Robert J. Frank; Allen Wood

[57] ABSTRACT

An image reader, which is capable of reading tone effects of a document precisely and can be miniaturized, includes a document glass, a light source for illuminating the document, an optical system for image formation of a reflected light from the document, an image reading section, a carriage, a driving motor for driving the carriage, a vertical scanning white reference board disposed outside an area, in which the document is mounted, within a range of reading and at least arranged apart from the carriage in a direction toward the document glass, a vertical scanning shading correction arrangement for correction to keep an image signal level at a constant level, and a locating section for locating a position in a horizontal scanning direction of the vertical scanning white reference board, whereby tone effects of the document can be read precisely and the image reader be miniaturized.

19 Claims, 12 Drawing Sheets

IMAGE READER

BACKGROUND OF THE INVENTION

1. Field of the Invention

This invention relates to an image reader such as an image scanner, a copying machine or the like that performs vertical scanning shading correction.

2. Description of the Related Art

Conventionally, an image reader has been used as an input device of an image scanner, a copying machine or the like, and recently a need for a high-quality image of the apparatus has been increased.

FIG. 13 is a sectional view of a conventional image reader, and FIG. 14 is a top view of the conventional one. As shown in FIGS. 13 and 14, the image reader comprises an image reader body 1, a document glass 2, a carriage 3, a supporting member 4, a shaft 5, a drive transmission member 6, a drive pulley 7, a follower pulley 8, a driving motor 9, a follower pulley supporting member 10, a spring member 11, a horizontal scanning white reference board 16, and a vertical scanning white reference board 17.

The document glass 2 is used to set a document manually. The carriage 3 is used to scan and read the document, and the supporting member 4, which contains bearings or the like, is fixed to the carriage 3. The shaft 5 supports the carriage 3 via the supporting member 4, and movement of the carriage 3 is restricted to a vertical scanning direction by the shaft 5. The drive transmission member 6, such as wire, a belt and the like, transmits a driving force to the carriage 3. The carriage 3 is connected to the drive transmission member 6, which is engaged with the carriage 3 via the drive pulley 7 and the follower pulley 8. The drive pulley 7 is connected to the driving motor 9 via a connecting shaft and a reduction mechanism (both not shown), and the carriage 3 is driven by rotating the driving motor 9. The follower pulley 8 is energized via the follower pulley supporting member 10 by the spring member 11, giving tension to the drive transmission member 6. The horizontal scanning white reference board 16 and the vertical scanning white reference board 17 shown in FIG. 14 are both fixed on the document glass 2 within a range readable by a line image sensor 14 described later.

FIG. 15 is a configuration diagram which shows an optical system of the conventional image reader. Since the document glass 2, the carriage 3, and the drive transmission member 6 in FIG. 15 are the same as those in FIG. 13, the same reference numerals are used for them and the description is omitted here. A light source 12 irradiates a document, and a reflecting mirror 13 reflects a reflected light from the document. The line image sensor 14 converts image information into electric signals, and an imaging lens 15 forms an image of a document on the line image sensor 14.

FIG. 16 is a block diagram showing an image reading circuit of a conventional image reader. In FIG. 16, a driver 18 controls the line image sensor 14, which outputs image signals R, G and B for every line each time a line synchronizing signal LS is inputted. Image signals R, G and B, corresponding to each pixel received by the line image sensor 14 are outputted in synchronization with a pixel clock CK. Amplifiers 19, 20 and 21 amplify levels of pixel signals of image signals, R, G and B outputted from the line image sensor 14, respectively, and output the amplified image signals R, G and B. A CPU 25 controls the driver 18 by using an image range signal a, and controls gains from the amplifiers 19, 20 and 21 via signal lines 22, 23 and 24 which transmit amplifier control signals r, g and b, respectively. The image range signal a is a signal indicating a period in which an image signal is actually outputted in synchronization with a line synchronizing signal LS. The CPU 25, which contains at least 3 or more channels of A-D converters, converts image signals R, G and B outputted by the amplifiers 19, 20 and 21, respectively, into digital signals. Also, the CPU 25, containing at least 3 or more channels of D-A converters, converts digital amplifier control signals into analog amplifier signals r, g and b, so as to control the amplifiers 19 to 21 as described above. A memory 26 is connected to the CPU 25. The CPU 25 controls the entire image reader facilities, and for example, controls the rotation of the driving motor 9 and turning-on of the light source 12.

The operation of the conventional image reader having the above configuration will be described below by using FIGS. 13 to 17. FIG. 17 is a positional relationship diagram showing the positional relationship between the vertical scanning white reference board 17 and the line image sensor 14. First, immediately after the image reader is turned on, or at an appropriate time when the image reader does not perform a reading operation, if necessary, the CPU 25 rotates the driving motor 9 so as to move the carriage 3 to a position in which the horizontal scanning white reference board 16 is readable and turns on the light source 12. When the light source 12 is turned on, a reflected light from the horizontal scanning white reference board 16 is reflected back by the reflecting mirror 13, and an image is formed on the line image sensor 14 by the imaging lens 15. The analog signals R, G and B obtained from the line image sensor 14 are converted into digital signals through the A-D converter in the CPU 25, and transferred to the memory 26. The CPu 25 reads the values transferred to the memory 26 and specifies values for amplifier control signals r, g and b so that the levels of the image signals R, G and B reach predetermined levels, respectively. The specified amplifier control signals r, g and b are converted from digital signals into analog signals through the D-A converter of the CPU 25, and transmitted to the amplifiers 19, 20 and 21, and the gains of the amplifiers 19, 20 and 21 are adjusted.

Next, after receiving an instruction to read a document sent from an external host computer (not shown), the CPU 25 drives the carriage 3 as well as turning on the light source 12. When the carriage 3 arrives at a start position for reading a document, a read operation is started. Then, the image signals R, G and B obtained from the line image sensor 14 are converted to digital signals through the A-D converter in the CPU 25, and after being subjected to image processing, if necessary, the signals are sequentially transferred, directly or via the memory 26, into the external host computer.

Next, vertical scanning shading correction is described below. In general, an LED, a fluorescent or a halogen lamp is used as a light source for an image reader. If fluctuation of the amount of light or the spectrum of the light source 12 during a document read operation is smaller than a quantization step of the A-D converter, signal levels after A-D conversion obtained from the vertical scanning white reference board 17 are constant, and therefore the tone effects of image data obtained from the document are kept constant. If the tone effects of the colors R, G and B are multi-tone such as 256 tones, however, fluctuation of the amount of light and the spectrum of the typical light source described above may be greater than the quantization step of the A-D converter, and therefore the signal level during a document read operation varies according to the fluctuation of the amount of light and the spectrum of the light source.

In the vertical scanning shading correction, fluctuation of the signal level caused by fluctuation of the amount of light and the spectrum of the light source is corrected so as to secure the tone effects of the image data. In general, the number of pixels of the line image sensor 14 is greater than that of a readable document size. By using the extra pixels, data on the vertical scanning white reference board 17 are read to obtain image signals to be used in the vertical scanning shading correction. At this time, the positions of pixels on the line image sensor 14 to be used in the vertical scanning shading correction are determined by a layout such as a document reading range. First, the CPU 25 stores, in the memory 26, signal levels Ar, Ag and Ab of the colors R, G and B obtained from the vertical scanning white reference board 17 before reading a document. The signal levels Ar, Ag and Ab become reference signal levels of the vertical scanning shading correction. Next, during image read operation, the CPU 25 obtains signal levels Br, Bg and Bb from the vertical scanning white reference board 17 at constant intervals of time or distance, and specifies the values of the amplifier control signals r, g and b, respectively, so that the signal levels Br, Bg and Bb are the same as the corresponding signal levels Ar, Ag and Ab previously obtained. As described above, the specified amplifier control signals r, g and b are converted from digital signals to analog signals through the D-A converter of the CPU 25, and transmitted to the amplifiers 19 to 20, adjusting the gains of the amplifiers 19 to 21.

As described above, in the vertical scanning shading correction, feedback control is performed for adjusting the gains of the amplifiers 19 to 21, based on the signal levels obtained from the vertical scanning white reference board 17, by means of the line image sensor 14. Thus, the tone effects of image data obtained from a document can be secured.

The conventional image reader described above, however, has the following two problems in the vertical scanning shading correction.

A first problem is that a greater width in the horizontal scanning direction is required for the vertical scanning white reference board 17, whereby a greater size of an image reader is required. The width in the horizontal scanning direction required for the vertical scanning white reference board 17 will be described below.

As mentioned above, the number of pixels of the line image sensor 14 includes more pixels than the number of pixels corresponding to a readable document size though the number of excessive pixels is not so great. For example, the number of pixels of a line image sensor made by Toshiba, TCD2551D, is 5,340. Under this condition, assuming that the optical resolution of the image reader is 600 dpi and the readable document size is 216 mm (letter size), the required number of pixels is equal to 216÷(25.4÷600), that is, 5,102, whereby the number of excessive pixels equals 238 (10.08 mm) calculated by 5,340–5,102. However, all of 10.08 mm is not available to the vertical scanning shading correction. First, the read area of the document and that of the vertical scanning white reference board 17 cannot be positioned contiguously on the line image sensor 14, and an interval of about 4 mm is required between them. The interval is needed because, during scanning in the vertical scanning direction, the carriage 3 is not necessarily operated to perform scanning in parallel with the vertical scanning white reference board 17, but the scanning may be performed obliquely by about ±2 mm according to assembly precision, and because another 2 mm or so is required for mounting precision of the vertical scanning white reference board 17 and the document glass or for a margin for mounting with adhesive or the like. In addition, even if the precision of the mounted position of the line image sensor 14 is optically adjusted, about ±1 mm is required, and another ±1 mm or so is required for the precision of the mounted position of the vertical scanning white reference board 17. Furthermore, since the document glass 2, the light source 12, and the components arranged around the light source 12 have a certain degree of reflectance, a part of the light reflected by the light source 12 and then reflected by the vertical scanning white reference board 17 is reflected by the document glass 2, the light source 12, and the components around the light source 12, thus returning again to the vertical scanning white reference board 17, to intensify the apparent brightness of the vertical scanning white reference board 17. The apparent brightness of the vertical scanning white reference board 17, due to the influence caused by scanning obliquely by ±2 mm or so according to the assembly precision when the carriage 3 is operated to perform scanning in the vertical scanning direction as described above, fluctuates unless there is a certain width in the horizontal scanning direction of the vertical scanning white reference board 17. Therefore, in order to remove the fluctuation in the brightness of the vertical scanning white reference board 17, it is required to keep constant the apparent brightness, and to provide the vertical scanning white reference board 17 with an approximately 3 mm wider width in the horizontal scanning direction for an area, on which the vertical scanning shading correction is performed.

Thus, the area actually available to the line image sensor for the vertical scanning shading correction equals 10.08 mm–(4+1+1+3) mm, that is, 1.08 mm at an end. Therefore, the width required of the vertical scanning white reference board 17 in the horizontal scanning direction equals, as shown in FIG. 17, the sum of a width of an area A available to the line image sensor 14 for the vertical scanning shading correction, a width of an area B obliquely scanned, an allowance C for the precision of the mounted position of the line image sensor 14 or the vertical scanning white reference board 17, and a width D required to keep the apparent brightness constant. In the example above, the result of the formula above is 1.08 mm+2×(2+1+1+3) mm=15.08 mm, and therefore the size in the horizontal scanning direction of the document glass 2 and the length of the light source 12 become greater, thus leading to a larger size of the image reader. In FIG. 17, to simplify the explanation, the line image sensor 14 is directly associated with the vertical scanning white reference board 17. It, however, applies to an optical system which is an equal-magnification optical system, and therefore for a reduction optical system, it is assumed that data are converted to data based on either of scales of the document or of the image (the line image sensor 14). Also, in order to perform the vertical scanning shading correction, it is necessary for the line image sensor 14 to read not only the document, but also the vertical scanning white reference board 17 by forming an image on a position different from that of the document. However, in a typical line image sensor, the positional precision of read pixels for a foot of a lead frame, which is a reference for mounting, is ±0.8 mm or so, which is not so high. The value of 0.8 mm is a size in the line image sensor 14. Assuming that the magnification of the optical system is 0.2, it amounts to ±4 mm (±0.8÷0.2=±4 mm) on a document.

Next, a second problem will be described. In the vertical scanning shading correction, the carriage 3 is operated to perform scanning so that the line image sensor 14 reads the vertical scanning white reference board 17. If there is dirt or the like on the vertical scanning white reference board 17 or a portion of the document glass 2 near the vertical scanning white reference board 17, the signal levels Br, Bg and Bb, which are referred to during the vertical scanning shading correction, fluctuate due to the dirt. Based on the signal levels Br, Bg and Bb, the CPU 25 specifies the values of amplifier control signals r, g and b so as to adjust the gains of the amplifiers 19, 20 and 21. Therefore, the CPU 25 has a problem of losing tone effects of image data obtained from the document due to the vertical scanning shading correction.

An image reader which can precisely read the tone effects of a document and which can be downsized would be desirable.

SUMMARY OF THE INVENTION

It is an object of the present invention to provide an image reader which can read tone effects of a document precisely and which can be miniaturized.

Therefore, to solve the problem, the image reader according to the present invention comprises a document glass on which a document is mounted, a light source for illuminating the document, an optical system for image formation of a reflected light from the document, an image reading section for reading the document image formed by the optical system, a carriage for scanning the document in a vertical scanning direction, a driving motor for driving the carriage, a vertical scanning white reference board disposed outside an area, on which the document is mounted on the document glass, within a range of reading the image reading section and at least arranged in a scanning direction of the carriage in a position apart from the carriage in a direction toward the document glass, a vertical scanning shading correction means for correction to keep image signals at a constant level by previously detecting fluctuation of image signal levels obtained from the image reading section with reading data in the vertical scanning white reference board, and a locating section for locating a position in a horizontal scanning direction of the vertical scanning white reference board.

According to this constitution, an image reader is achieved which can read tone effects of a document precisely and can be miniaturized.

Figure 1:
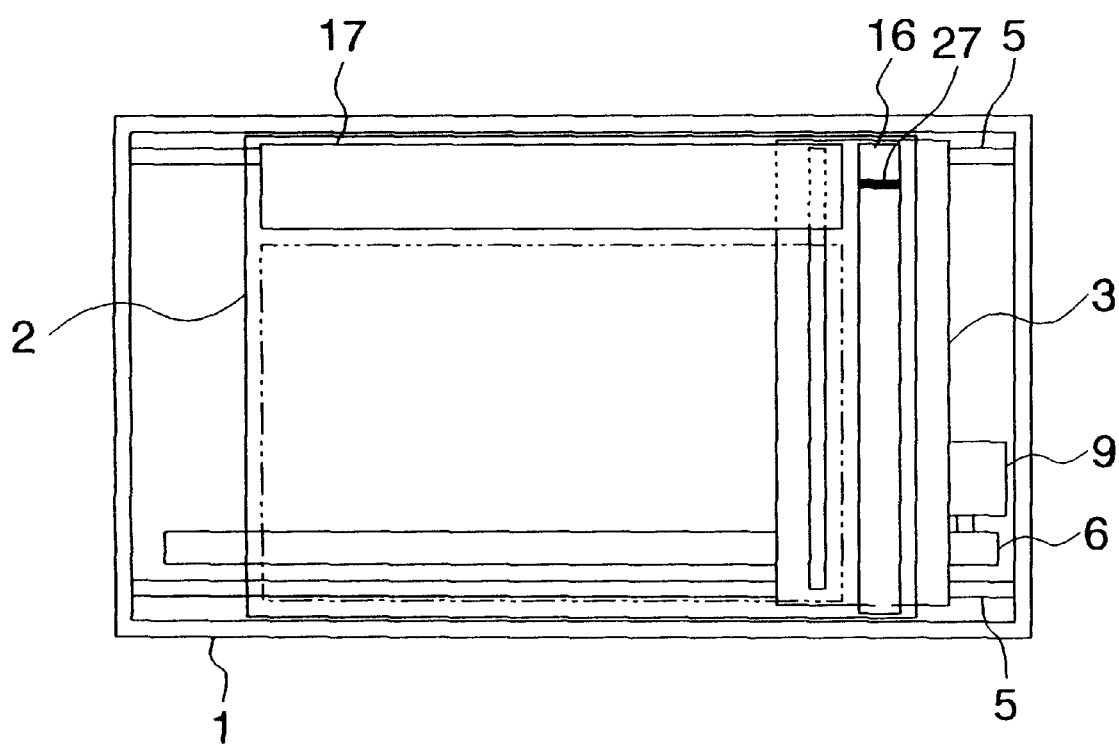
FIG. 1 is a top view illustrating an image reader according to a first embodiment of the present invention.

According to a first aspect of the present invention, there is provided an image reader comprising a document glass on which a document is mounted, a light source for illuminating the document, an optical system for image formation of a reflected light from the document, an image reading section for reading the document image formed by the optical system, a carriage for scanning the document in a vertical scanning direction, a driving motor for driving the carriage, a vertical scanning white reference board disposed outside an area, on which the document is mounted on the document glass, within a range of an area to be read by the image reading section and at least arranged in a scanning direction of the carriage in a position apart from the carriage in a direction toward the document glass, a vertical scanning shading correction means for correction to keep image signals at a constant level by previously detecting fluctuation of image signal levels obtained from the image reading section with reading data in the vertical scanning white reference board, and a locating section for locating a position in a horizontal scanning direction of the vertical scanning white reference board, whereby it has an effect of locating pixels where the vertical scanning white reference board is placed on the image reading section by means of the locating section.

There is provided an image reader as set forth above, further comprising an edge detecting means having a locating section which is a marker, the marker being arranged in a position satisfying an image formation relationship of an optical system outside an area, on which a document is mounted, on a document glass and also within a range of an area to be read by an image reading section, a locating section for locating a position of a vertical scanning white reference board by detecting an edge of a marker read by an image reading section, whereby it has an effect of locating pixels where the vertical scanning white reference board is placed on the image reading section by means of the marker.

According to a second aspect of the present invention, there is provided an image reader comprising a document glass on which a document is mounted, a light source for illuminating the document, an optical system for image formation of a reflected light from the document, an image reading section for reading the document image formed by the optical system, a carriage for scanning the document in a vertical scanning direction, a driving motor for driving the carriage, a vertical scanning white reference board disposed outside an area, on which the document is mounted, on the document glass and within a range of an area to be read by the image reading section and at least arranged in a scanning direction of the carriage in a position apart from the carriage in a direction toward the document glass, a vertical scanning shading correction means for correction to keep image signals at a constant level by previously detecting fluctuation of image signal levels obtained from the image reading section with reading data in the vertical scanning white reference board, and a usage judgment means for judging whether or not there is an inappropriate area in the vertical scanning white reference board, whose data is read by the image reading section, to determine that inappropriate area cannot be used when judging that there is an inappropriate area, whereby it has an effect of omitting the vertical scanning shading correction if there is any dust or dirt on the vertical scanning white reference board.

There is provided an image reader as set forth above, wherein the usage judgment means issues a warning to a user if a value indicating inappropriateness of the inappropriate area exceeds a predetermined value so as to perform a document reading operation without an execution of the vertical scanning shading correction or to inhibit the document reading operation, whereby it has an effect of omitting the vertical scanning shading correction if there is a predetermined amount or more of dust or dirt on the vertical scanning white reference board.

According to a third aspect of the present invention, there is provided an image reader comprising a document glass on which a document is mounted, a light source for illuminating the document, an optical system for image formation of a reflected light from the document, an image reading section for reading the document image formed by the optical system, a carriage for scanning the document in a vertical scanning direction, a driving motor for driving the carriage, a vertical scanning white reference board disposed outside an area, on which the document is mounted on the document glass, within a range of an area to be read by the image reading section and at least arranged in a scanning direction of the carriage in a position apart from the carriage in a direction toward the document glass, a vertical scanning shading correction means for correction to keep image signals at a constant level by previously detecting fluctuation of image signal levels obtained from the image reading section with reading data in the vertical scanning white reference board, and a defocusing section for defocusing the image on the vertical scanning white reference board read by the image reading section, whereby it has an effect that, even if any dust, dirt, or other contaminant is put on the vertical scanning white reference board, there is no drop-off in the image signal levels read from the vertical scanning white reference board.

There is provided an image reader as set forth above, wherein the defocusing section is a vertical scanning white reference board arranged in a position apart from the document glass in a glass thickness direction, whereby it has an effect that the data on the vertical scanning white reference board read by the image reading section is defocused by an arrangement of the vertical scanning white reference board.

Alternatively, there is provided an image reader as set forth above, wherein the defocusing section is a diffuse transmission board arranged between the vertical scanning white reference board in an optical path of the optical system and the image reading section, whereby it has an effect that the data on the vertical scanning white reference board read by the image reading section is defocused by the diffuse transmission board.

According to a fourth aspect of the present invention, there is provided an image reader comprising a document glass on which a document is mounted, a light source for illuminating the document, an optical system for image formation of a reflected light from the document, an image reading section for reading the document image formed by the optical system, a carriage for scanning the document in a vertical scanning direction, a driving motor for driving the carriage, a vertical scanning white reference board disposed outside an area, on which the document is mounted on the document glass, within a range of an area to be read by the image reading section and at least arranged in a scanning direction of the carriage in a position apart from the carriage in a direction toward the document glass, a vertical scanning shading correction means for correction to keep image signals at a constant level by previously detecting fluctuation of image signal levels obtained from the image reading section with reading data in the vertical scanning white reference board, and a level fluctuation preventive section for preventing fluctuation of the image signal levels read by the image reading section even if a transmission obstacle such as dust is put on the vertical scanning white reference board, whereby it has an effect that there is no fluctuation on the image signal level from the vertical scanning white reference board.

There is provided an image reader as set forth above, wherein the level fluctuation preventive section, which is integrally mounted on the carriage, is a vertical scanning white reference board arranged on this side of the document glass, whereby it has an effect that the image signal level from the vertical scanning white reference board does not fluctuate since the vertical scanning white reference board is integrally mounted on the carriage.

There is provided an image reader as set forth above, wherein the level fluctuation preventive section is a vertical scanning white reference board arranged on this side of the document glass, being integrally mounted on the carriage at such an angle that an illuminating light emitted from the light source is incident on the image reading section most intensively, whereby it has effects that the image signal level from the vertical scanning white reference board does not fluctuate since the vertical scanning white reference board is integrally mounted on the carriage and that it is possible to increase the image signal level from the vertical scanning white reference board.

DESCRIPTION OF THE PREFERRED EMBODIMENTS

The embodiments of the present invention will be described below by using FIGS. 1 to 12.

Figure 13:
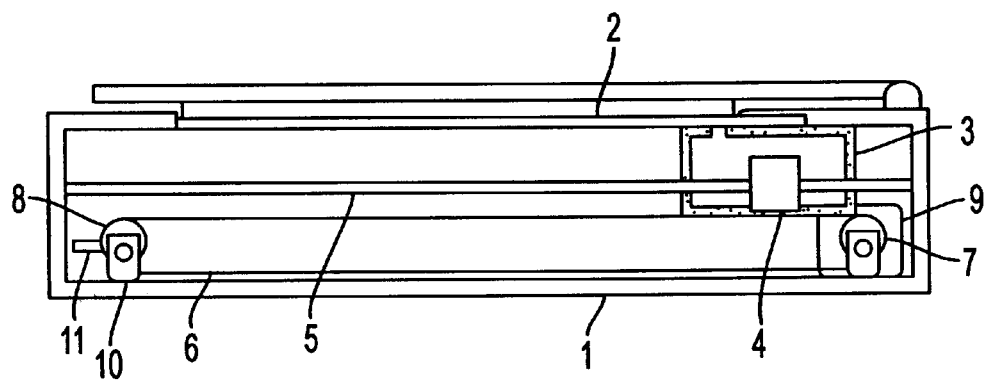
FIG. 13 is a section view illustrating a conventional image reader.
Figure 15:
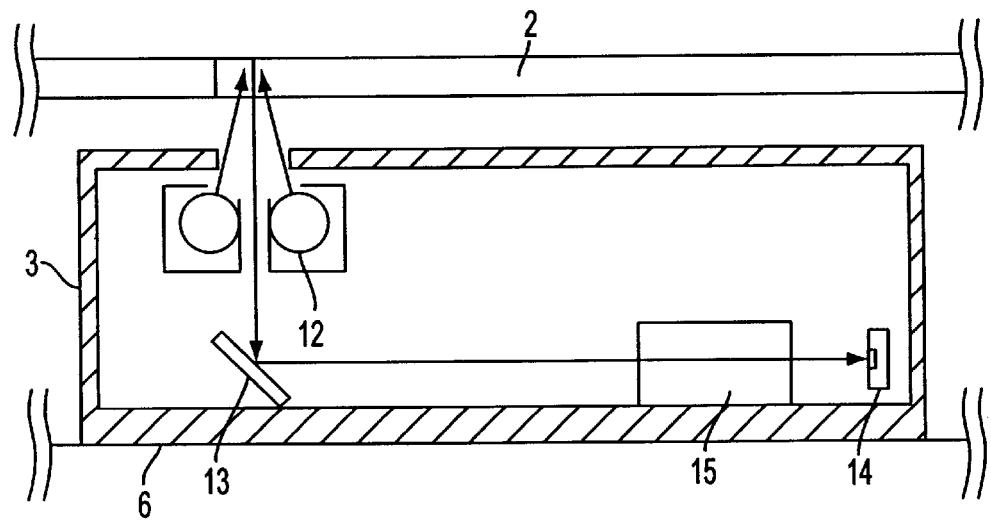
FIG. 15 is a configuration diagram illustrating an optical system of a conventional image reader.
Figure 16:
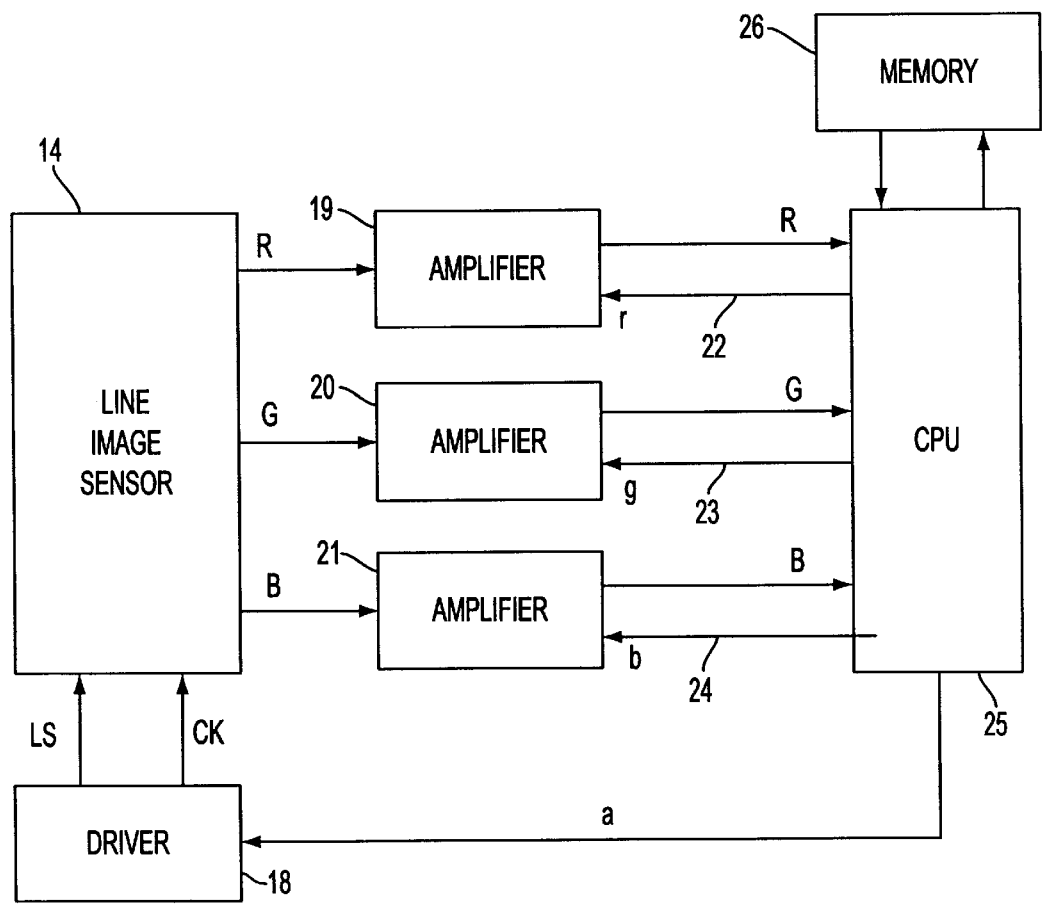
FIG. 16 is a block diagram illustrating an image reading circuit of a conventional image reader.
Figure 17:
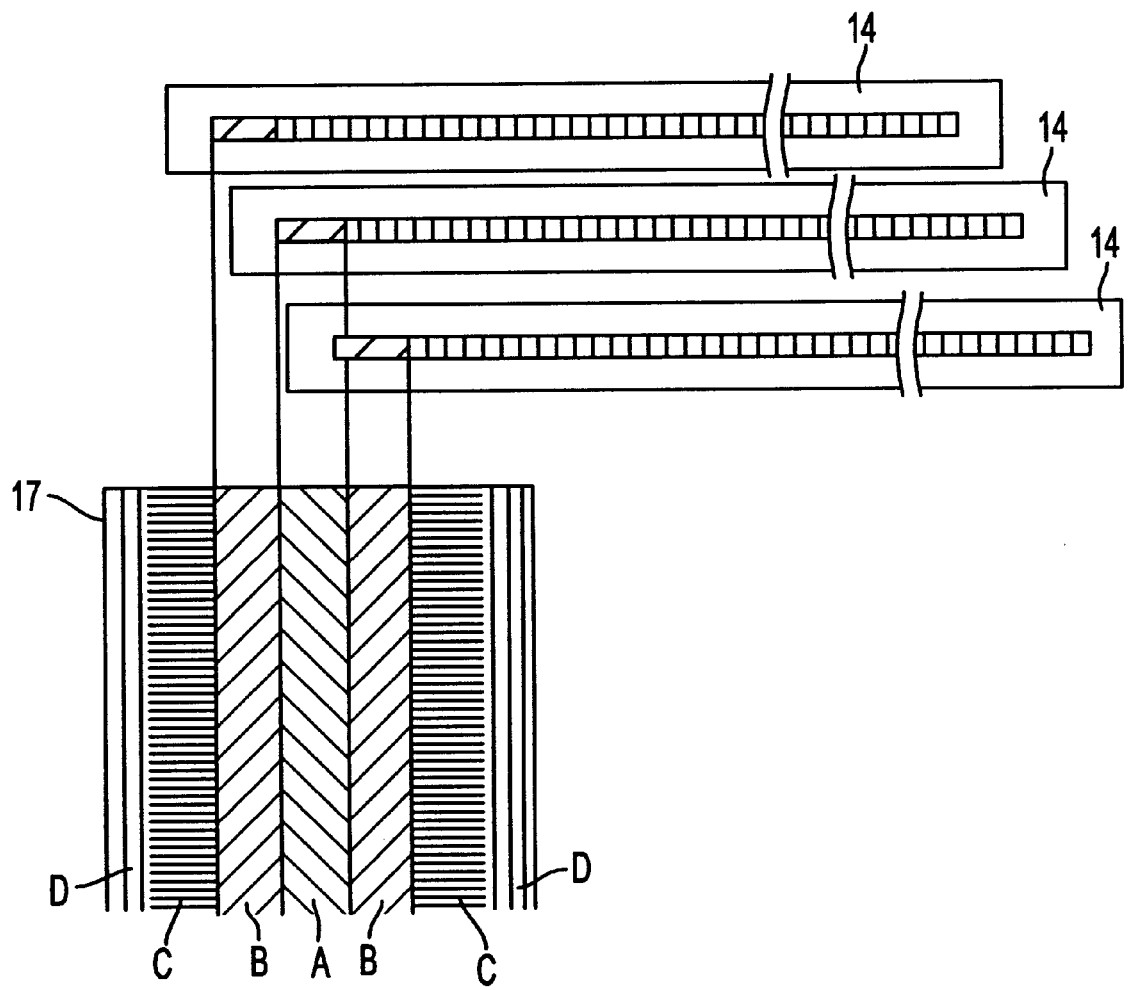
FIG. 17 is a positional relationship diagram illustrating a positional relationship between a vertical scanning white reference board and a line image sensor.

A sectional view of an image reader, an optical system, and an image reading circuit according to a first embodiment of the present invention are the same as those in FIGS. 13, 15, and 16, and therefore their explanation is omitted here. Referring to FIG. 1, there is shown a top view illustrating the image reader according to the first embodiment of the present invention. In FIG. 1, a marker (a locating section) 27 is arranged to locate the position of a vertical scanning white reference board 17 in a horizontal scanning direction. The marker 27 is arranged in a position which satisfies an image formation relationship of an optical system outside an area, on which a document is mounted, within a range of an area to be read by a line image sensor (an image reading section) 14, and the relative position to the vertical scanning white reference board 17 is determined with a mechanical precision. The color of the marker 27 is black and the area therearound in the horizontal scanning direction is white.

Figure 2:
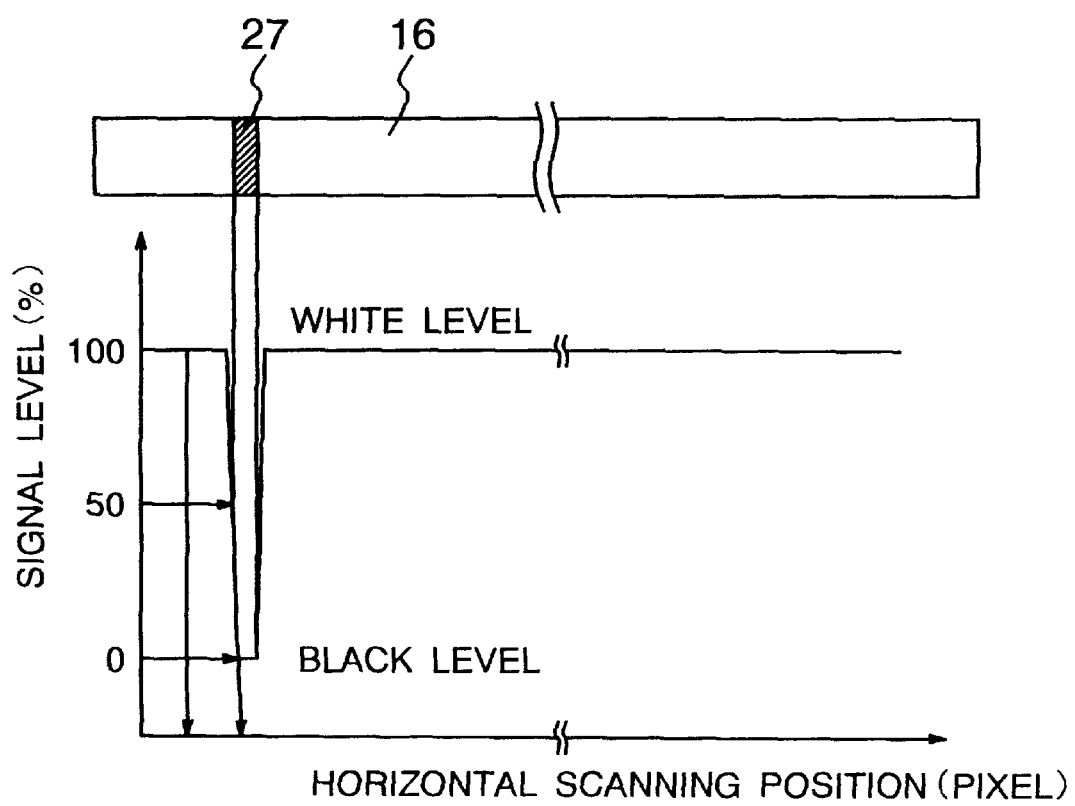
FIG. 2 is a signal level diagram illustrating a signal level distribution in a horizontal scanning direction of a line image sensor.
Figure 3:
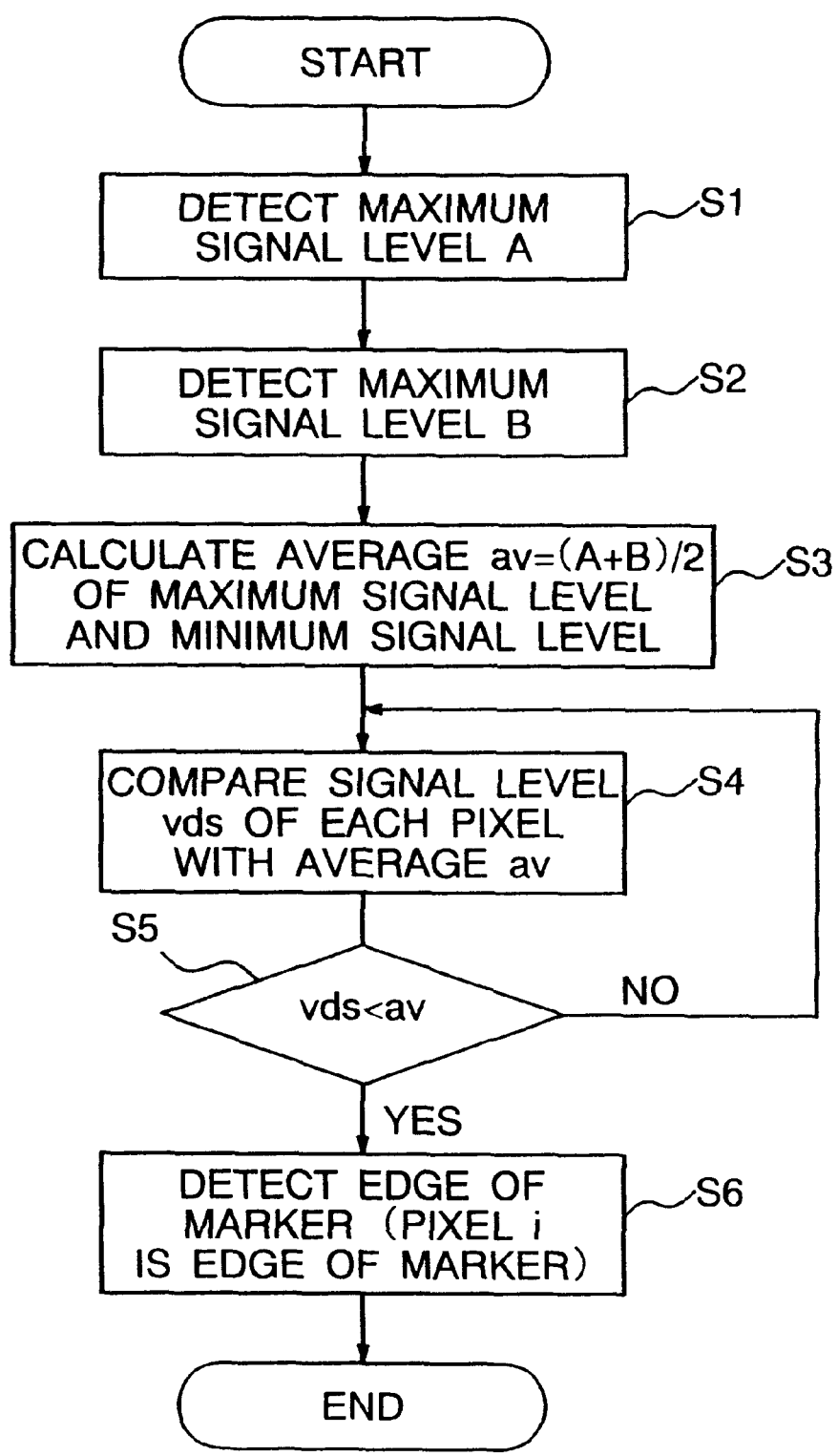
FIG. 3 is a flowchart illustrating an operation for locating a position in the horizontal scanning direction of a vertical scanning white reference board.
Figure 4:
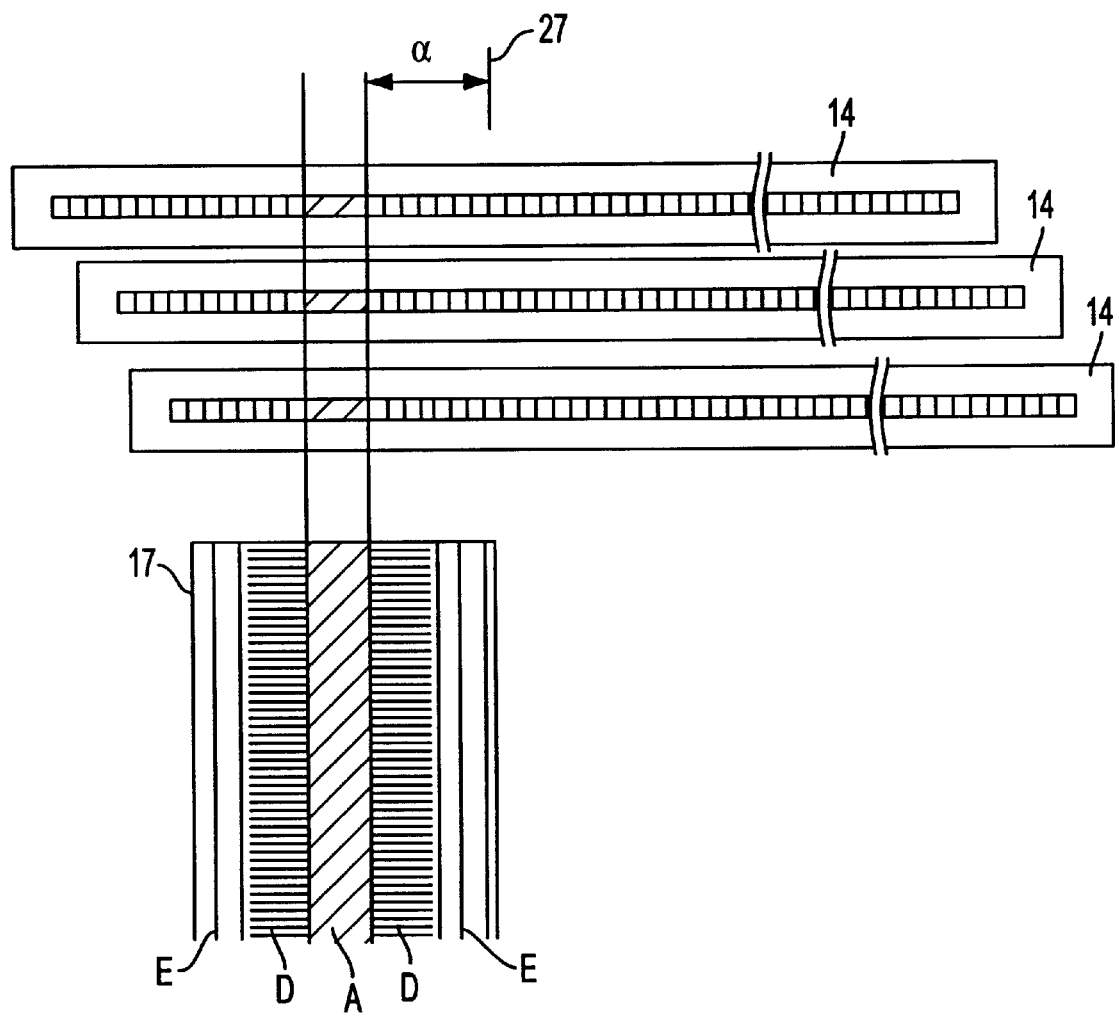
FIG. 4 is a positional relationship diagram illustrating a positional relationship among a marker, the vertical scanning white reference board, and the line image sensor.

With reference to FIGS. 2 to 4, an explanation will be presented below for the operation of the image reader having the constitution as set forth above, in other words, an operation of locating the position of the vertical scanning white reference board 17 in the horizontal scanning direction to detect fluctuation of the image signal levels based on the located area. Referring to FIG. 2, there is shown a signal level diagram illustrating the signal level distribution of the line image sensor 14 in the horizontal scanning direction. Referring to FIG. 3, there is shown a flowchart illustrating the operation for locating the position of the vertical scanning white reference board 17 in the horizontal scanning direction. Referring to FIG. 4, there is shown a positional relationship diagram illustrating the positional relationship among the marker 27, the vertical scanning white reference board 17 and the line image sensor 14. In FIG. 2, the abscissa axis indicates the horizontal scanning position and the ordinate axis indicates the image signal level. In FIG. 4, the line image sensor 14 is directly associated with the vertical scanning white reference board 17 to simplify the explanation. It, however, applies to an optical system which is an equal-magnification optical system, and therefore for a reduction optical system, it is assumed that data are converted to data based on either the scale of the document or of the image (the line image sensor 14).

First, the CPU 25 (see FIG. 16) causes a driving motor 9 to rotate to move a carriage 3 to a position where the marker 27 can be read so as to turn on a light source 12. When the light source 12 (see FIG. 15) is turned on and the marker 27 is irradiated, the reflected light is reflected by a mirror 13 and an image is formed on the line image sensor 14 by an imaging lens 15. An analog signal obtained from the line image sensor 14 is converted to a digital signal by means of an A-D converter of the CPU 25 and is transferred to a memory 26. As described above, the marker 27 is black and the area therearound in the horizontal scanning direction is white, and therefore the distribution of the above image digital signal values has lower density at the marker 27 and higher density in regions other than the marker 27 (See FIG. 2). It is assumed here, however, that shading correction is executed in the horizontal scanning direction so as to have almost constant image digital signal values in the above white portion and that the signals to be used are limited to G (green) signals which have generally the highest correlation with brightness information, in other words, on which resolution information is reflected most accurately.

Next, the CPU 25 detects an edge of the marker 27 by means of an internal edge detecting means (not shown). The CPU 25 finds out the highest value of the image digital signal values (the image digital signal value in the white portion) and the lowest value thereof (the image digital signal value at the marker 27) (S1, S2), and then stores the average av of the two values into a memory 26 (S3). Next, the CPU 25 compares the image digital signal value vds of each pixel with the average av sequentially (S4). Assuming that the reference position is an edge between the above white portion and the black portion of the marker 27, an edge detecting means of the CPU 25 repeats the operation of step 4 until the image digital signal value vds changes from a value greater than the average av to a smaller one (S5). Since the image digital signal value vds corresponds to a pixel of the line image sensor 14, the pixel at the position where the image digital signal vds has changed from a value greater than the average av to a smaller one corresponds to the pixel where one edge of the marker 27 is image-formed on the line image sensor 14 (S6). As mentioned above, the relative position between the marker 27 and the vertical scanning white reference board 17 is determined with a mechanical precision, and therefore, as shown in FIG. 4, a pixel at a position a pixels apart from the position of the pixel where the image of the edge of the marker 27 is formed corresponds to a pixel (a pixel where the vertical scanning white reference board 17 is sensed by the line image sensor 14) indicating the reference position in the horizontal scanning direction of the vertical scanning white reference board 17. Once the pixel at the reference position is located, the vertical scanning shading correction can be performed in the same manner as for the conventional one.

According to the embodiment as mentioned above, it is possible to locate a pixel where the vertical scanning white reference board 17 is sensed by the line image sensor 14 and to detect fluctuation of the image signal level based on the area of the vertical scanning white reference board 17 corresponding to the located pixel, and therefore it is possible to reduce the width required of the vertical scanning white reference board 17 in the horizontal scanning direction, to locate accurately the position of the vertical scanning white reference board 17 with respect to the line image sensor 14, to read tone effects of a document precisely, and to downsize the apparatus.

A sectional view and a top view of an image reader, an optical system, and an image reading circuit according to a second embodiment of the present invention are the same as those in FIGS. 13, 14, 15, and 16, and therefore their explanation is omitted here. The image reader according to this embodiment is characterized by a usage judgment means (not shown) in a CPU 25.

Figure 5:
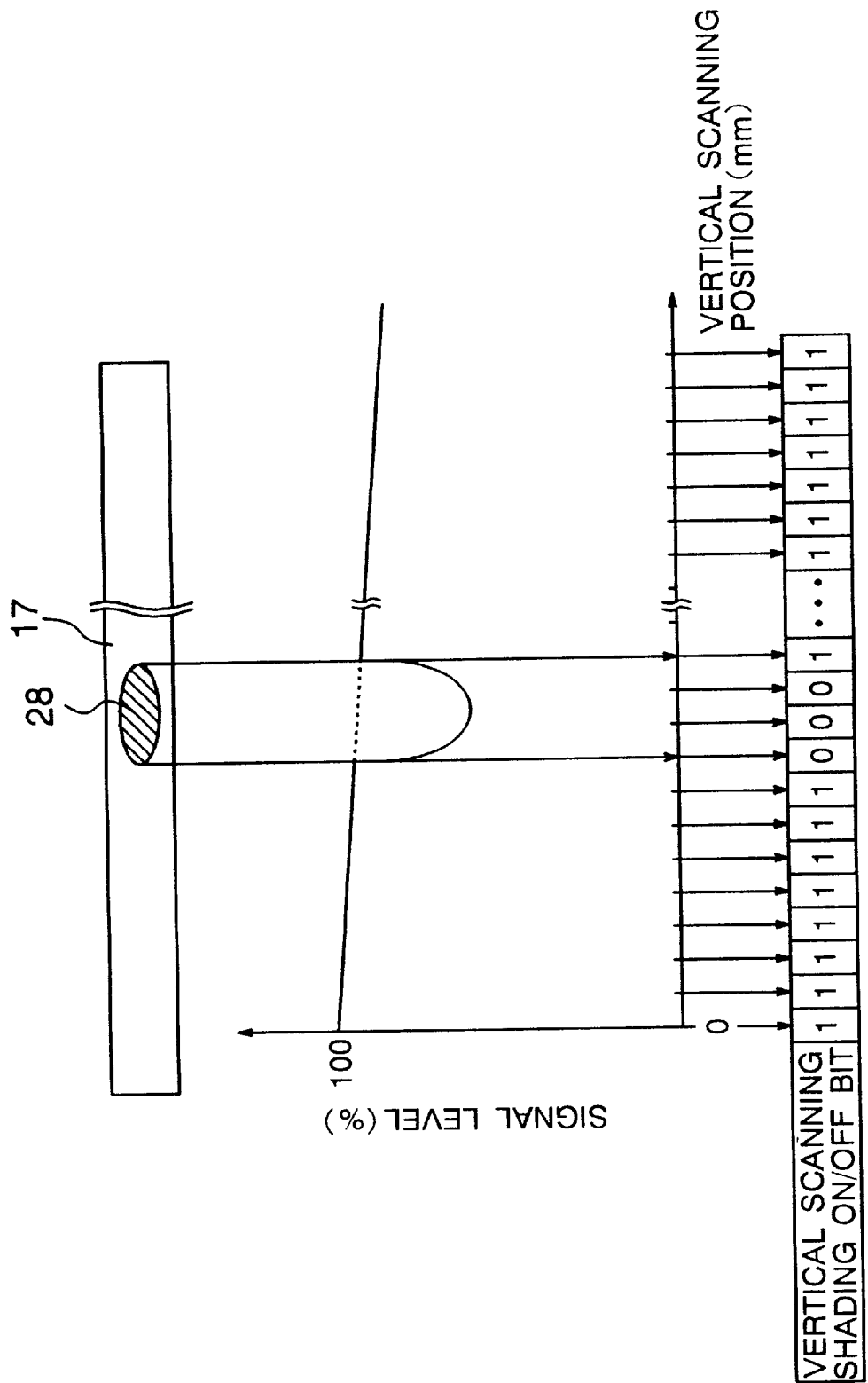
FIG. 5 is a signal level diagram illustrating a distribution of image digital signal values in the vertical scanning direction obtained by reading data in the vertical scanning white reference board by using the line image sensor.

With reference to FIG. 5, an operation of an image reader having the above configuration will be described below. Referring to FIG. 5, there is shown a signal level diagram illustrating the distribution of image digital signal values in the vertical scanning direction obtained by reading data on a vertical scanning white reference board 17 by means of a line image sensor 14; the abscissa axis indicates the vertical scanning position and the ordinate axis indicates the image signal level. In FIG. 5, contaminant 28 is dust, dirt or the like adhering to the vertical scanning white reference board 17. The image reader according to this embodiment is intended for detecting an area inappropriate for vertical scanning white reference board usage due to the contaminant 28 such as dust or dirt adhering thereto so as to inhibit use of the area in the vertical scanning shading correction.

First, the operation of detecting an area inappropriate for vertical scanning white reference board usage due to the contaminant 28 such as dust or dirt adhering to the vertical scanning white reference board 17 will be explained. The CPU 25 causes the driving motor 9 to rotate to move the carriage 3 to a predetermined position where the vertical scanning white reference board 17 can be read and turns on the light source 12. When the light source 12 is turned on, the reflected light from the vertical scanning white reference board 17 is reflected by a mirror 13 and an image is formed on the line image sensor 14 by the imaging lens 15. An analog signal obtained from the line image sensor 14 is converted to a digital signal by means of an A-D converter of the CPU 25. Then, the image signal level at each position of the vertical scanning white reference board 17 is transferred to the CPU 25 by repeating the above operation while scanning the carriage 3 at a predetermined speed. In this case, the image signal level is lowered as indicated by a solid line in a portion where the contaminant 28 such as dust or dirt adheres. It is assumed here that the signals to be used are limited to G (green) signals which have generally the highest image signal level.

The usage judgment means of the CPU 25 compares the inputted image signal level with a previously set value, and if the image signal level is smaller than the set value, it judges that a contaminant such as dust or dirt adheres and then writes the information into the memory 26 as a vertical scanning shading ON/OFF bit (See FIG. 5). If the usage judgment means judges that the area is inappropriate, it writes "0" into the memory 26. If a vertical scanning shading correction can be applied, it writes "1" into the memory 26. Accordingly, only 1 bit is required for indicating the state of a single place. By repeating the above operation while the carriage 3 is under scanning, it is judged whether or not the vertical scanning white reference board is inappropriate whenever the line image sensor 14 reads an image of a single line, and then the judgment result is written into the memory 26.

Although only 1 bit of memory capacity is required per line in the above method, the required memory reaches 7,000 bits (1×7,000=7,000) if it is assumed that there are 7,000 lines as the length of the vertical scanning white reference board 17. Any fluctuation in the amount of light of an actual light source or fluctuation of to spectrum, however, is so small that it can be ignored for a time, during which the line image sensor 14 can read an image of a single line with scanning by the carriage 3, and therefore it does not need to execute a vertical scanning shading correction for every line and the vertical scanning shading correction can be executed for every several lines. For example, assuming that the amount of light of the light source or fluctuation of the spectrum is required to be corrected every two seconds and it takes two ms to read a single-line data, the correction is required only once for 1,000 lines (2×1000/2=1,000) and just seven bits (1×7,000/1,000=7) is required in the memory 26. In a typical image scanner, however, the reading resolution is often variable even if the read time for a single line is fixed, and a higher reading resolution leads to a slower moving speed of the carriage 3. Therefore, even if the moving distance of the carriage 3 is identical, the number of the lines is increased at a higher resolution. If a low resolution is applied to the detecting operation of an area inappropriate for use as the vertical scanning white reference board 17 and a high resolution is applied to reading the data, it causes insufficient vertical scanning shading ON/OFF bits. Therefore, if the reading resolution is variable, the detection must be performed at the highest resolution. Although this processing increases the required memory capacity, the increment is approximately 50 bits and it is sufficiently small.

Next, an explanation will be presented of the vertical scanning shading correction. It is assumed here that detection is made every several lines for an area inappropriate for usage as the vertical scanning white reference board 17.

If a document read instruction is issued from an external host computer (not shown), the CPU 25 turns on the light source 12 and drives the carriage 3. When the carriage 3 reaches a document reading start position, the read operation is started, an image signal obtained from the line image sensor 14 is converted to an image digital signal by means of the A-D converter of the CPU 25, it is subjected to image processing if necessary, and it is, directly or after being transferred to the memory 26, transferred to an external host computer sequentially. The CPU 25 reads out the vertical scanning shading ON/OFF bit nearest the reading position at predetermined line intervals according to the reading resolution at that time during the read operation, and then performs a vertical scanning shading correction, if possible. If the bit is set to "1", the CPU performs the vertical scanning shading correction. If the bit is set to "0", it does not perform the vertical scanning shading correction. Assuming that the highest reading resolution is 600 dpi, for example, 2 (600/300=2) is obtained as an interval of the vertical scanning shading correction if the reading resolution is 300 dpi, in other words, the CPU reads out the bit for every 1,000 lines with skipping every single vertical scanning shading ON/OFF bit, and then performs the vertical scanning shading correction, if possible. If the reading resolution is 301 dpi, a relation for the vertical scanning shading correction is expressed by 600/301<2, in other words, the CPU reads out the bit for every 502 (1,000×301/600=502) lines sequentially without skipping any vertical scanning shading ON/OFF bit, and then performs the vertical scanning shading correction, if possible.

In a series of the operations as set forth above, the vertical scanning shading correction makes it possible to read tone effects of a document precisely without being affected by dust or dirt which may adhere to the vertical scanning white reference board 17.

In addition, in the above configuration, if the size or area of the vertical scanning white reference board 17 which has been detected to be inappropriate exceeds a set value, it is possible to issue a warning to the user, to read the document without the vertical scanning shading correction, or to inhibit the document read operation.

Furthermore, as described above, in detecting an area to be inappropriate for usage as the vertical scanning white reference board 17 due to a contaminant such as dust or dirt, judgment is given only based on whether the signal level is greater or smaller than the predetermined value in comparison. By obtaining the gradient of the change of the signal level so as to locate a position where the gradient significantly changes or where the gradient is inverted, however, it is possible to increase the judgment precision.

According to the above embodiment, the usage judgment means of the CPU 25 compares the inputted image signal level with a previously set value, judges that a contaminant 28 such as dust or dirt adheres if the image signal level is smaller than the set value and writes the information as a vertical scanning shading ON/OFF bit into the memory 26, whereby it is possible to detect an area that is inappropiate for usage as the vertical scanning white reference board 17 due to a contaminant 28 such as dust or dirt adhering thereto based on the vertical scanning shading ON/OFF bit value, to inhibit the vertical scanning shading correction for the area, and to remove effects of the contaminant 28 such as dust or dirt to the vertical scanning shading correction.

Figure 6:
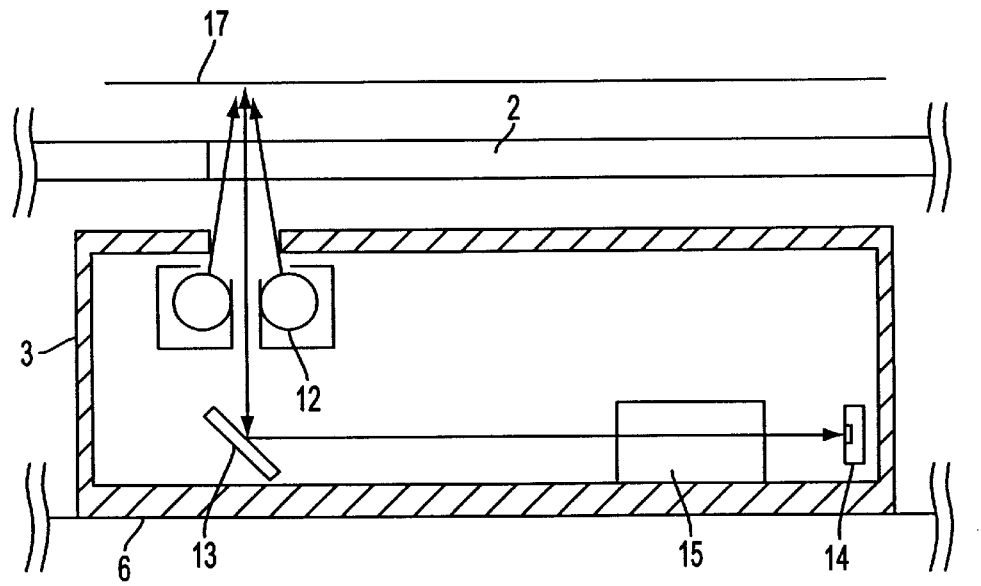
FIG. 6 is a configuration diagram illustrating an optical system of an image reader according to a third embodiment of the present invention.
Figure 14:
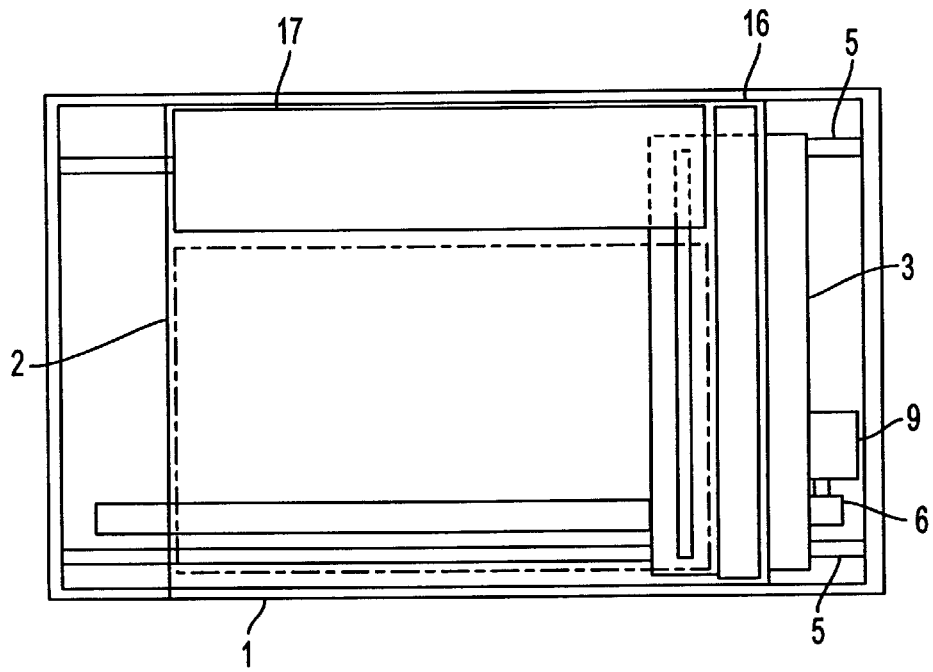
FIG. 14 is a top view illustrating a conventional image reader.

A sectional view and a top view of an image reader and an image reading circuit according to a third embodiment of the present invention are the same as those in FIGS. 13, 14, and 16, and therefore their explanation is omitted here. The image reader according to this embodiment is characterized by an arrangement of a vertical scanning white reference board 17. Referring to FIG. 6, there is shown a configuration diagram illustrating an optical system of an image reader according to the embodiment of the present invention. The arrangement shown in FIG. 6 is different from the conventional one in that the vertical scanning white reference board 17 is fitted apart from the document glass 2 in a direction such that the length of the optical path of the optical system becomes longer.

Figure 7:
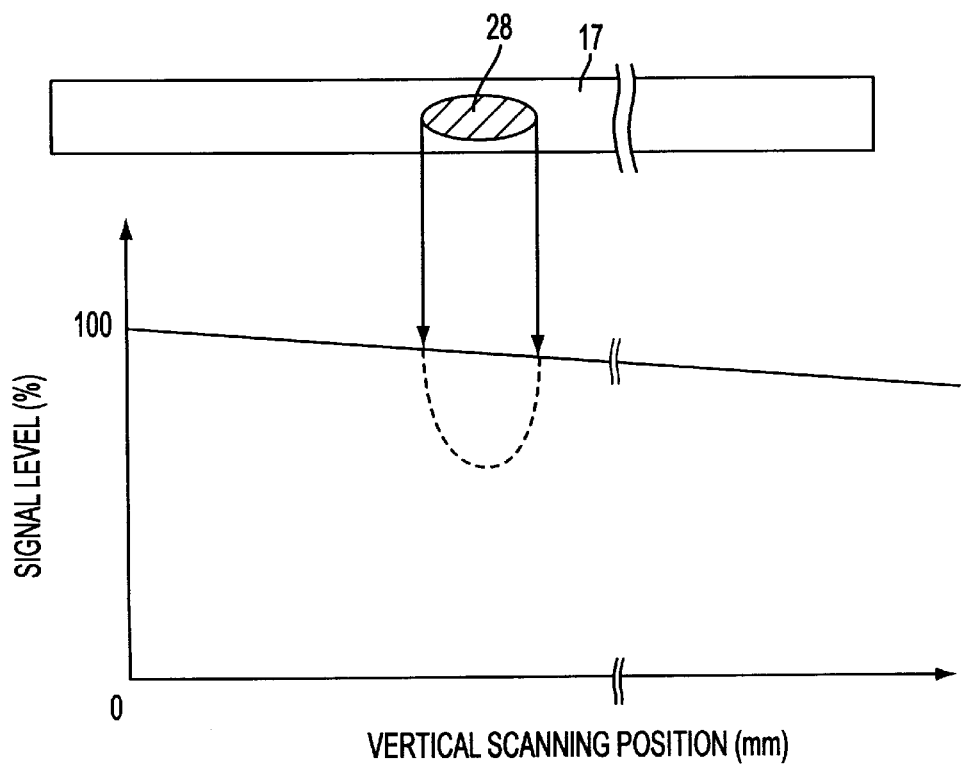
FIG. 7 is a signal level diagram illustrating a distribution of image digital signal values in a vertical scanning direction obtained by reading a vertical scanning white reference board by using a line image sensor.

With reference to FIG. 7, the operation of the image reader having the above configuration will be described below. Referring to FIG. 7, there is shown a signal level diagram illustrating the distribution of image digital signal values in the vertical scanning direction obtained by reading data on the vertical scanning white reference board 17 by means of the line image sensor 14; the abscissa axis indicates the vertical scanning position and the ordinate axis indicates the image signal level.

In the conventional one, the vertical scanning white reference board 17 is mounted on the document glass 2, and an image is formed in a state such that the vertical scanning white reference board 17 is focused on the line image sensor 14. Accordingly, in the conventional one, if a contaminant 28 such as dust or dirt adhere, to the vertical scanning white reference board 17 or the glass where the vertical scanning white reference board 17 is positioned, the image signal level drops at the position of, the contaminant 28, as indicated by a dotted line in the vertical scanning direction distribution of the image signal level obtained from the vertical scanning white reference board 17 shown in FIG. 7. In this embodiment, however, the vertical scanning white reference board 17 is fitted apart from the document glass 2 in a direction such that the length of the optical path of the optical system becomes longer, whereby an image is formed in a state such that the vertical scanning white reference board 17 is not focused on the line image sensor 14, and therefore even if data are read from an having a contaminant 28 such as dust or dirt, light is incident from a surrounding portion other than the contaminant adhering portion so as to achieve a distribution as indicated by a solid line in FIG. 7, and therefore the image signal level does not drop much at where a contaminant 28 such as dust or dirt adheres. In other words, only the amount of light of the light source 12 and fluctuation of the spectrum appear as fluctuation of the image signal level.

Although it is not specifically indicated which color is used for the image signal level in FIG. 7 for simplification, any color among R, G, and B can be used. Furthermore, though the vertical scanning white reference board 17 is fitted apart from the document glass 2 in a direction such that the length of the optical path of the optical system becomes longer in this embodiment, the same effect is obtained by placing the vertical scanning white reference board 17 between the document glass 2 and the light source 12 so as to provide defocusing. In this arrangement, however, the layout is significantly restricted since the vertical scanning white reference board is fitted between the document glass 2 and the light source 12, and therefore there is a possibility that the effect cannot be achieved due to an insufficient distance.

According to the embodiment as described above, the vertical scanning white reference board 17 is arranged apart from the document glass in the glass thickness direction so as to be a defocusing section, whereby even if a contaminant 28 adheres to the vertical scanning white reference board 17, light is incident from the surrounding portion other than the contaminant adhering portion so as not to reduce the image signal level from the vertical scanning white reference board 17, and therefore it is possible to remove the effect of the contaminant 28 so as to achieve an accurate vertical scanning shading correction and to read tone effects of the document precisely.

Figure 8:
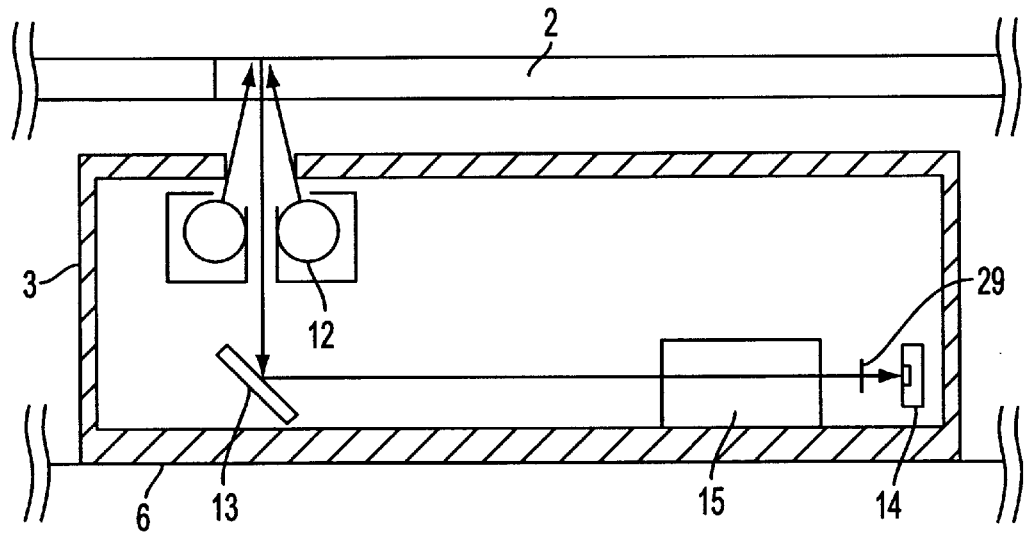
FIG. 8 is a configuration diagram illustrating an optical system of an image reader according to a fourth embodiment of the present invention.

A sectional view and a top view of an image reader and an image reading circuit according to a fourth embodiment of the present invention are the same as those in FIGS. 13, 14, and 16, and therefore their explanation is omitted here. Referring to FIG. 8, there is shown a configuration diagram illustrating an optical system of an image reader according to this embodiment. The arrangement shown in FIG. 8 is different from the conventional one in that a diffuse transmission board (a defocusing section) 29 is fitted in an area, in which an image is formed on the vertical scanning white reference board 17 in the horizontal scanning direction, on the optical path between the imaging lens 15 and the line image sensor 14.

Figure 9:
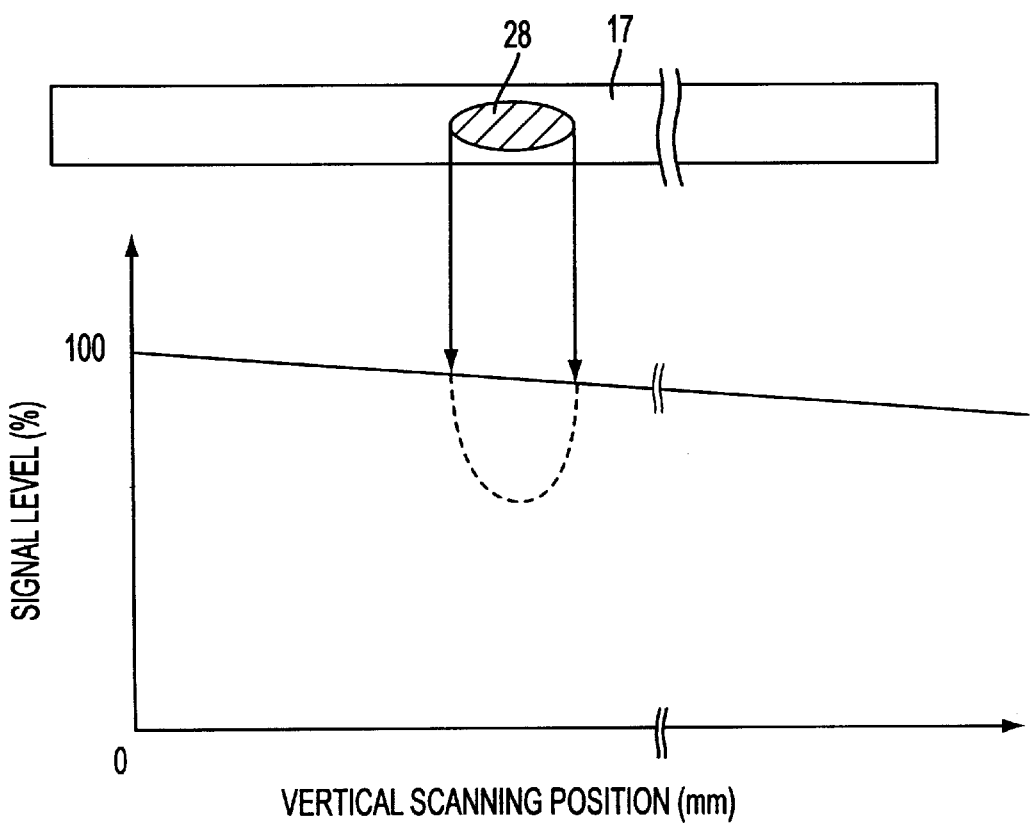
FIG. 9 is a signal level diagram illustrating a distribution of image digital signal values in a vertical scanning direction obtained by reading a vertical scanning white reference board by using a line image sensor.

With reference to FIG. 9, the operation of the image reader having the above configuration will be described below. Referring to FIG. 9, there is shown a signal level diagram illustrating the distribution of image digital signal values in the vertical scanning direction obtained by reading data on the vertical scanning white reference board 17 by means of the line image sensor 14; the abscissa axis indicates the vertical scanning position and the ordinate axis indicates the image signal level. In FIG. 9, contaminant 28 is dust or dirt adhering to the vertical scanning white reference board 17.

In the conventional one, an image is formed on the vertical scanning white reference board 17 in a state such that it is focused on the line image sensor 14. Accordingly, in the conventional one, if a contaminant 28 such as dust or dirt adheres to the vertical scanning white reference board 17 or the glass where the vertical scanning white reference board 17 is positioned, the image signal level drops where the contaminant 28 such as dust or dirt adheres, as indicated by a dotted line in the vertical scanning direction distribution of the image signal level obtained from the vertical scanning white reference board 17 shown in FIG. 9. In this embodiment, however, the diffuse transmission board 29 is fitted in the area in which an image is formed on the vertical scanning white reference board 17, on the optical path between the imaging lens 15 and the line image sensor 14, whereby, in the same manner as for the third embodiment, even if data are read from an area to which the contaminant 28 such as dust or dirt adheres, light is incident from a surrounding portion other than the contaminant adhering portion so as to achieve a distribution as indicated by a solid line in FIG. 9, and therefore the image signal level does not drop much at all in a portion, to which the contaminant 28 such as dust or dirt adheres. In other words, only fluctuation of the amount of light of the light source and that of the spectrum appear as fluctuation of the image signal level.

Although it is not specifically indicated which color is used for the image signal level in FIG. 9 for simplification, any color among R, G and B can be used.

According to the embodiment as described herein-above, the diffuse transmission board 29 is fitted as a defocusing section in the area, in which an image is formed on the vertical scanning white reference board 17 in the horizontal scanning direction, on the optical path between the imaging lens 15 and the line image sensor 14, whereby even if the contaminant 28 adheres to the vertical scanning white reference board 17, light is incident from a surrounding portion other than the contaminant adhering portion so as to prevent the image signal level from dropping, and therefore it is possible to remove the influence caused by the contaminant 28, so as to perform accurate vertical scanning shading correction, thus leading to precise reading of tone effects of the document.

Figure 10:
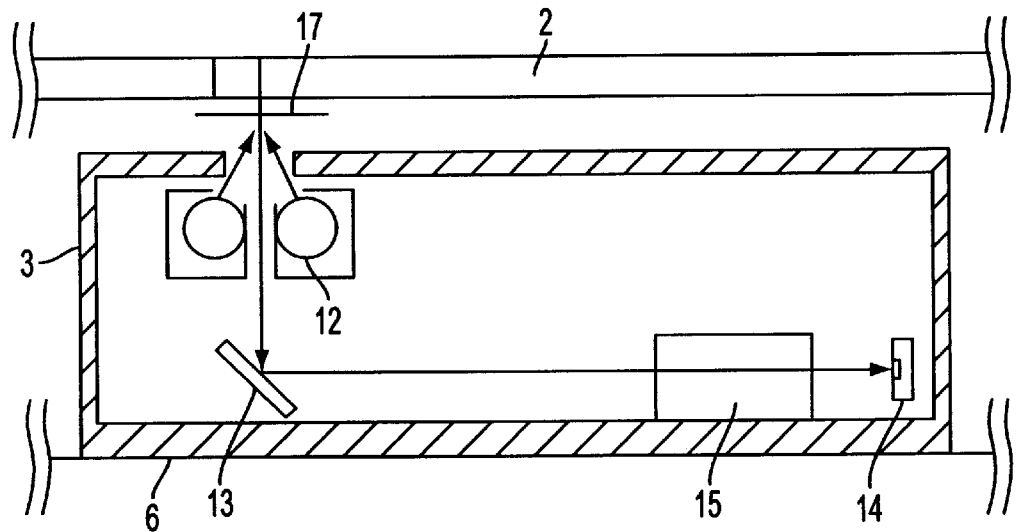
FIG. 10 is a configuration diagram illustrating an optical system of an image reader according to a fifth embodiment of the present invention.

A sectional view and a top view of an image reader and an image reading circuit according to a fifth embodiment of the present invention are the same as those in FIGS. 13, 14, and 16, and therefore their explanation is omitted here. Referring to FIG. 10, there is shown a configuration diagram illustrating an optical system of an image reader according to this embodiment. The arrangement shown in FIG. 10 is different from the conventional one in that a vertical scanning white reference board 17 is fixed outside an area, on which a document is mounted, within a reading range of the line image sensor 14 between the carriage 3 and the document glass 2 above the carriage 3.

The operation of the image reader having the above configuration will be described below. In FIG. 10, the vertical scanning white reference board 17 is fixed above the carriage 3, and thus even if a contaminant such as dust or dirt adheres thereto, the same state is always secured during the document read operation, and therefore the image signal level may be lowered, but there is no fluctuation of the image signal level caused by the contaminant 28 such as dust or dirt. In other words, only fluctuation of the amount of light of the light source or its spectrum appears as fluctuation of the image signal level.

According to the embodiment as described hereinabove, the vertical scanning white reference board 17 is fixed above the carriage 3, whereby even if a contaminant 28 such as dust or dirt adheres to the vertical scanning white reference board 17, the same state is always secured during document read operation, and therefore it is possible to prevent fluctuation of the image signal level from being caused by the contaminant 28 such as dust or dirt, and thus an accurate vertical scanning shading correction can be performed so as to read tone effects of the document precisely.

Figure 11:
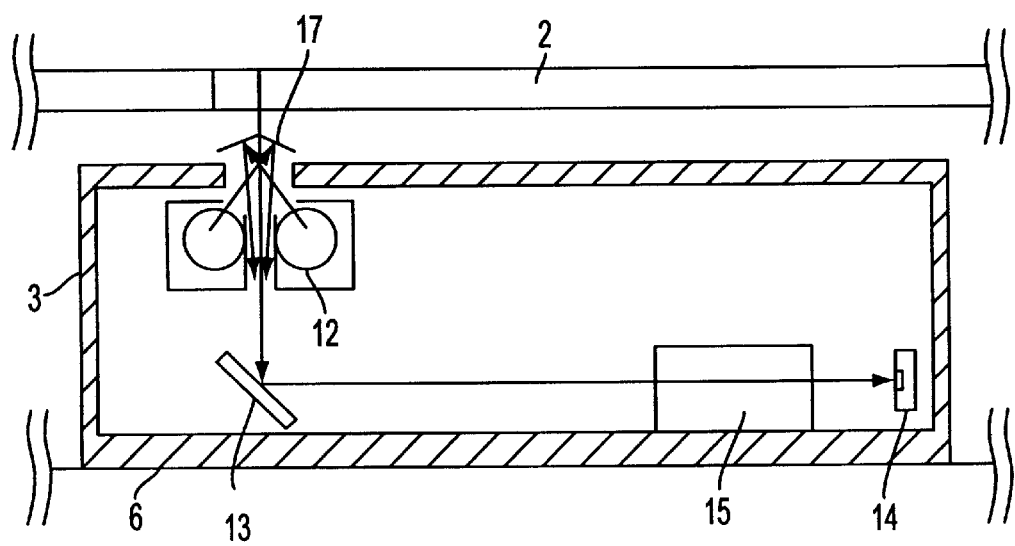
FIG. 11 is a configuration diagram illustrating an optical system of an image reader according to a sixth embodiment of the present invention.

A sectional view and a top view of an image reader and an image reading circuit according to a sixth embodiment of the present invention are the same as those in FIGS. 13, 14, and 16, and therefore their explanation is omitted here. Referring to FIG. 11, there is shown a configuration diagram illustrating an optical system of an image reader according to this embodiment. The arrangement shown in FIG. 11 is different from the conventional one in that a vertical scanning white reference board 17 is fixed outside an area, in which a document is mounted, within a reading range of the line image sensor 14 between the carriage 3 and document glass 2 above the carriage 3 and that the vertical scanning white reference board 17 is fixed at an angle such that an obtained image signal level is the highest.

Figure 12:
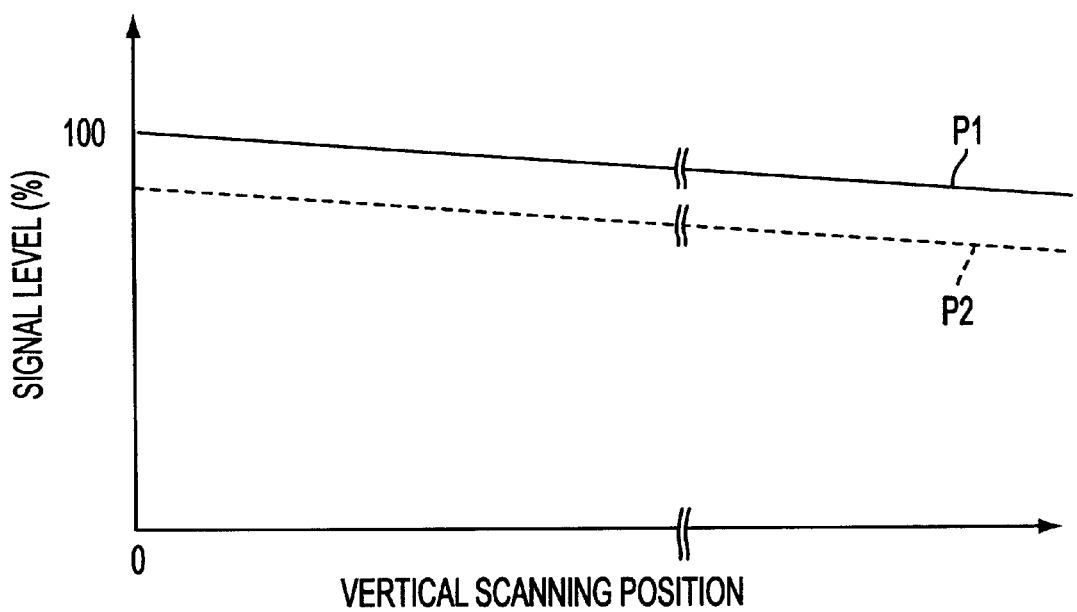
FIG. 12 is a signal level diagram illustrating a distribution of image digital signal values in a vertical scanning direction obtained by reading a vertical scanning white reference board by using a line image sensor.

With reference to FIG. 12, the operation of the image reader having the above configuration will be described below. Referring to FIG. 12, there is shown a signal level diagram illustrating the distribution of image digital signal values in the vertical scanning direction obtained by reading data on the vertical scanning white reference board 17 by means of the line image sensor 14; the abscissa axis indicates the vertical scanning position and the ordinate axis indicates the image signal level. In FIG. 11, the vertical scanning white reference board 17 is fixed above the carriage 3, whereby even if a contaminant 28 such as dust or dirt adheres to the vertical scanning white reference board 17, the same state is always secured during a document read operation, and thus there is no fluctuation of the image signal level caused by a contaminant such as dust or dirt. In other words, only fluctuation of the amount of light of the light source or to spectrum appears as fluctuation of the image signal level. In addition, by fixing the vertical scanning white reference board 17 at such an angle that the image signal level of the line image sensor 14 is the highest, the image signal level can be increased as indicated by a solid line P1 and a dotted line P2 in FIG. 12 (the image signal level can be the level indicated by the solid line P1, which is higher than the level indicated by the dotted line P2), and therefore it is possible to achieve resistance to noise, thus to increase the precision of the gain adjustment by the amplifiers 19, 20, and 21 in the vertical scanning shading correction.

According to the embodiment as described herein-above, the vertical scanning white reference board 17 is fixed above the carriage 3 at an angle such that the obtained image signal level is the highest, whereby even if a contaminant 28 such as dust or dirt adheres to the vertical scanning white reference board 17, the same state is always assured during a document read operation, and therefore it is possible to prevent fluctuation of the image signal level from being caused by a contaminant such as dust or dirt, and further to increase the image signal level, thus leading to more accurate vertical scanning shading correction and precise reading of tone effects of the document.

According to the image reader of the present invention as set forth hereinabove, it is possible to locate pixels where the vertical scanning white reference board is placed by means of the locating section, whereby there are advantages in that the width of the vertical scanning white reference board required in the horizontal scanning direction can be decreased and in that the position of the vertical scanning white reference board can be accurately located on the image reading section, and therefore tone effects of the document can be read precisely and the apparatus can be downsized.

In addition, the pixels where the vertical scanning white reference board is placed can be reliably located by the marker, and therefore there are the advantages that tone effects of the document can be read precisely without fail and that the apparatus can be downsized.

Furthermore, the vertical scanning shading correction can be omitted if a contaminant such as dust or dirt adheres to the vertical scanning white reference board, and therefore there is the advantage that it is possible to remove the influence on the vertical scanning shading correction caused by a contaminant such as dust or dirt.

Still further, if a value indicating inappropriateness of the inappropriate area exceeds a predetermined value, a warning is issued to the user so as to read a document without performing the vertical scanning shading correction or to inhibit the document reading operation, whereby there is an advantage in that various countermeasures can be taken if there is an inappropriate area on the vertical scanning white reference board.

Furthermore, by providing a defocusing section, it is possible to prevent an image signal level obtained from the vertical scanning white reference board from dropping even if a contaminant such as dust or dirt adheres to the vertical scanning white reference board, whereby there is an advantage in that tone effects of the document can be read precisely.

Still further, the read data from the vertical scanning white reference board by the image reading section can be defocused by an arrangement of the vertical scanning white reference board, thus preventing the image signal level obtained from the vertical scanning white reference board from dropping even if a contaminant such as dust or dirt adheres, whereby there is an advantage in that tone effects of the document can be read precisely.

Additionally, the read data by the image reading section can be defocused by the diffuse transmission board, thus preventing the image signal level obtained from the vertical scanning white reference board from dropping even if a contaminant such as dust or dirt adheres, whereby there is an advantage in that tone effects of the document can be read precisely.

Furthermore, fluctuation of the image signal level from the vertical scanning white reference board can be restrained by the level fluctuation preventive section, thus keeping a constant level of the image signal read from the vertical scanning white reference board even if a contaminant such as dust or dirt adheres, whereby there is an advantage in that tone effects of the document can be read precisely.

Still further, the vertical scanning white reference board is integrally mounted on the carriage, thus keeping a constant level of the image signal read from the vertical scanning white reference board even if a contaminant such as dust or dirt adheres, whereby there is an advantage in that tone effects of the document can be read precisely.

Yet further, the vertical scanning white reference board is integrally mounted on the carriage at such an angle that the image signal level is increased, thus keeping a constant level of the image signal read from the vertical scanning white reference board even if a contaminant such as dust or dirt adheres, whereby there is an advantage in that tone effects of the document can be read precisely.

What is claimed is:

1. An image reader comprising a document glass on which a document is positioned, a light source for illuminating the document, an optical system for image formation of a reflected light from the document, an image reading section for reading the document image formed by said optical system, a carriage for scanning the document in a vertical scanning direction, a driving motor for driving said carriage, a vertical scanning white reference board disposed outside an area, in which the document is positioned on said document glass, within a range of an area to be read by said image reading section and at least arranged in a scanning direction of said carriage in a position apart from said carriage in a direction toward said document glass, a vertical scanning shading correction means for correction to keep an image signal level at a constant level by previously detecting fluctuation of said image signal level obtained from said image reading section with reading data from the vertical scanning white reference board, and a locating section for locating a position in a horizontal scanning direction of the vertical scanning white reference board, said locating section being provided within a range where the vertical scanning white referenced board is disposed in the horizontal scanning direction.

2. An image reader according to claim 1, wherein:
said locating section is a marker;
said marker is arranged in a position satisfying an image formation relationship of said optical system outside an area, in which the document is positioned on said document glass, and within the range of the area to be read by said image reading section; and
further comprising an edge detecting means for locating a position of the vertical scanning white reference board by detecting an edge of said marker read by said image reading section.

3. An image reader comprising a document glass on which a document is positioned, a light source for illuminating the document, an optical system for image formation of a reflected light from the document, an image reading section for reading the document image formed by said optical system, a carriage for scanning the document in a vertical scanning direction, a driving motor for driving said carriage, a vertical scanning white reference board disposed outside an area, on which the document is positioned on said document glass, within a range of an area to be read by said image reading section and at least arranged in a scanning direction of said carriage in a position apart from said carriage in a direction toward said document glass, a vertical scanning shading correction means for correction to keep an image signal level at a constant level by previously detecting fluctuation of said image signal level obtained from the image reading section with reading data from said vertical scanning white reference board, a usage judgment means for judging whether or not there is an inappropriate area in said vertical scanning white reference board whose data is read by said image reading section, to determine that inappropriate area cannot be used when judging that there is an inappropriate area, and control means for using that area, which usage is judged by said usage judgement means to be usable, to cause said vertical scanning shading correction means to perform shading correction.

4. An image reader according to claim 3, wherein said usage judgment means issues a warning to a user if a value indicating inappropriateness of said inappropriate area exceeds a predetermined value so as to perform a document read operation without performing the vertical scanning shading correction or to inhibit the document read operation.

5. An image reader comprising a document glass on which a document is positioned, a light source for illuminating the document, an optical system for image formation of a reflected light from the document, an image reading section for reading the document image formed by said optical system, a carriage for scanning the document in a vertical scanning direction, a driving motor for driving said carriage, a vertical scanning white reference board disposed outside an area, on which the document is positioned on said document glass, within a range of an area to be read by said image reading section and at least arranged in a scanning direction of said carriage in a position apart from said carriage in a direction toward said document glass, said vertical scanning white reference board being fixed in a position apart from the focussing position, and means for correction to keep an image signal level at a constant level by previously detecting fluctuation of said image signal level obtained from said image reading section with reading data from the vertical scanning white reference board.

6. An image reader for reading an image from a document, comprising:
a document glass to receive the document;
a carriage;
means for moving the carriage parallel to the document glass along a path that extends in a vertical scanning direction;
a line image sensor mounted on the carriage, the line image sensor being oriented in a horizontal scanning direction that is transverse to the vertical scanning direction;
a light source mounted on the carriage to illuminate the document;
an optical system mounted on the carriage to focus light that has been reflected by the document onto the line image sensor;
means for detecting contaminates on the vertical scanning white reference board; and
means for performing shading correction using light reflected from uncontaminated areas of the vertical scanning white reference board.

7. An image reader for reading an image from a document, comprising:

a document glass to receive the document;

a carriage;

means for moving the carriage parallel to the document glass along a path that extends in a vertical scanning direction;

a line image sensor mounted on the carriage, the line image sensor being oriented in a horizontal scanning direction that is transverse to the vertical scanning direction;

a light source mounted on the carriage to illuminate the document;

an optical system mounted on the carriage to focus light that has been reflected by the document onto the line image sensor; and a vertical summary white reference board which is illuminated by the light source but which is located such that light reflected from the vertical scanning white reference board is not sharply focused on the line image sensor by the optical system, the vertical scanning white reference board being out-of-focus at the line image sensor.

8. The image reader of claim 7, wherein the vertical scanning white reference board is disposed below the document glass.

9. The image reader of claim 7, wherein the vertical scanning white reference board is disposed above the document glass.

10. The image reader of claim 7, wherein the vertical scanning white reference board is disposed above the document glass.

11. An image reader for reading an image from a document, comprising:

a document glass to receive the document;

a carriage;

means for moving the carriage parallel to the document glass along a path that extends in a vertical scanning direction;

a line image sensor mounted on the carriage, the line image sensor being oriented in a horizontal scanning direction that is transverse to the vertical scanning direction;

a light source mounted on the carriage to illuminate the document;

an optical system mounted on the carriage to focus light that has been reflected by the document onto the light image sensor;

a vertical scanning white reference board; and a horizontal scanning white reference board, the horizontal scanning white reference board having a marker that marks the position of the vertical scanning white reference board.

12. The image reader of claim 11, further comprising means for detecting an edge of the marker from signals produced by line image sensor.

13. The image reader of claim 11, wherein the vertical scanning white reference board is illuminated by the light source but is located such that light reflected from the vertical scanning white reference board is not sharply focused on the line image sensor, the vertical scanning white reference board being out-of-focus at the line image sensor.

14. The image reader of claim 13, wherein the vertical scanning white reference board is disposed below the document glass.

15. The image reader of claim 13, wherein the vertical scanning white reference board is disposed above the document glass.

16. The document reader of claim 11, further comprising means for detecting contaminants on the vertical scanning white reference board.

17. An image reader comprising a document glass on which a document is positioned, a light source for illuminating the document, an optical system for image formation of a reflected light from the document, an image reading section for reading the document image formed by said optical system, a carriage for scanning the document in a vertical scanning direction, a driving motor for driving said carriage, a vertical scanning white reference board disposed outside an area, in which the document is positioned on said document glass, within a range of an area to be read by said image reading section and at least arranged in a scanning direction of said carriage in a position apart from said carriage in a direction toward said document glass, a vertical scanning shading correction means for correction to keep an image signal level at a constant level by previously detecting fluctuation of said image signal level obtained from said image reading section with reading data from said vertical scanning white reference board, and a level fluctuation preventive section for preventing fluctuation of the image signal level read by said image reading section even if a transmission obstacle such as dust adheres to the vertical scanning white reference board.

18. An image reader according to claim 17, wherein said document glass has a side that faces said carriage and a side that faces away from said carriage, and wherein said level fluctuation preventive section is integrally mounted on said carriage and is said vertical scanning white reference board, arranged on the side of said document glass that faces said carriage.

19. An image reader according to claim 17, wherein said document glass has a side that faces said carriage and a side that faces away from said carriage, and wherein said level fluctuation preventive section is said vertical scanning white reference board, said vertical scanning white reference board being arranged on the side of said document glass that faces said carriage and being integrally mounted on said carriage at such an angle that an illuminating light emitted from said light source is incident on said image reading section most intensively.

* * * * *